May 22, 1934.     H. PETERS     1,959,640
AIR CHAMBER OF PUMPS
Filed Sept. 8, 1932
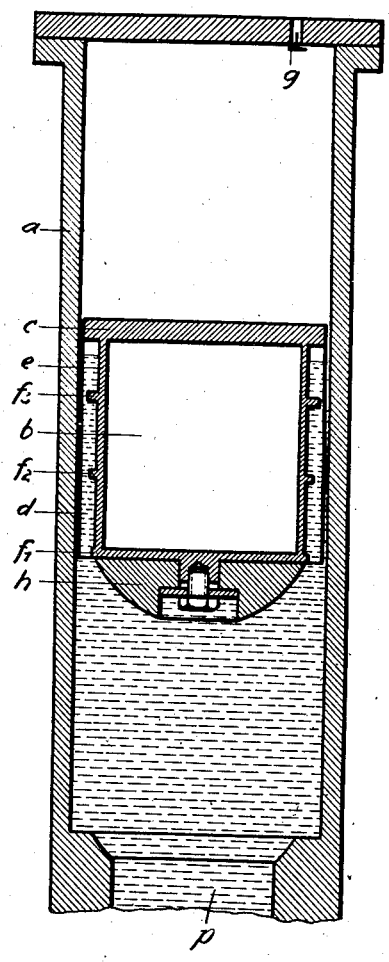
HANS PETERS
INVENTOR
BY Haseltine, Lake & Co.
ATTORNEYS Patented May 22, 1934

1,959,640

UNITED STATES PATENT OFFICE 1,959,640

AIR CHAMBER OF PUMPS

Hans Peters, Berlin, Germany, assignor to Knorr-Bremse Aktiengesellschaft, Berlin, Germany, a corporation of Germany Application September 8, 1932, Serial No. 632,144
In Germany October 24, 1931

3 Claims. (Cl. 137—71)

This invention relates to air chambers of pumps, its object being to prevent losses of air therefrom due to absorption by water.

The known fact that in the air chambers of pumps the air contained in the upper part of said chambers is gradually absorbed by the water, so that the chamber becomes gradually filled with water and then no longer fulfils its object of exerting an equalizing effect on the suction and pressure pipe, has already led to the construction of various devices intended to remedy this defect.

The known devices, for example sifting devices, have not been capable of thoroughly obviating the said drawback, because the reason of the undesirable phenomenon has evidently not been appreciated.

Experiments and observations in connection with air chambers have shown that the gradual loss of air is mainly to be attributed to the fact that particles of liquid are projected from the water contained in the chamber by internal pressure into the air above the water in the form of drops or spray, and when falling back carry considerable quantities of air with them.

Using this observation as a point of departure, the invention aims to remedy the defect by preventing the water projecting sprays or drops into the air contained in the chamber. This is effected by the surface of the water being separated from the air by a suitably constructed float covering and projecting above the level of the water. The float is preferably so constructed that the greater part of its body is immersed in the water. In the free space between the float and the wall of the air chamber, annular baffle surfaces surrounding the cylindrical float body are suitably arranged, the breadth of which increases upwards. The last of these surfaces can be the upper surface of the float, which lies so close to the wall of the air chamber that only a narrow annular clearance is left between it and the said wall to ensure the necessary mobility of the float.

In order that the said invention may be clearly understood and readily carried into effect, the same will now be described more fully with reference to the accompanying drawing in which a compressed air vessel with a float according to the invention is diagrammatically illustrated in vertical section.

In the air vessel $a$, which is connected at the bottom to the pressure pipe or suction pipe $p$, is a float $b$ which is represented as a cylindrical hollow body. The roof $c$ of the float extends beyond the body $e$ of the cylinder and is close to the wall of the air vessel. On the exterior of the cylinder body $e$ are guide ribs $d$, which have the same radial breadth as the roof $c$. Around the body $e$ are annular baffle surfaces $f_1$, $f_2$, $f_3$, which obstruct the upward movement of the water, and the breadth of which increases upwards.

In cases where the supply of air in the air vessel is replaced at will, for example through a non-return valve $g$, the float $b$ is provided with a lower conical attachment $h$ of rubber or the like acting as a valve, which cuts off communication between the air vessel and the feed pipe or pressure pipe $p$ when the vessel is being filled with air, in order to prevent the passage of air into the said pipe, the level of the water remaining at the same height in relation to the upper surface of the float as shown in the drawing. The connection of the air vessel with the pipe $p$ is therefore controlled as by a mushroom valve.

What I claim and desire to secure by Letters Patent of the United States is:—

1. In a pump having a compressed air vessel in free communication with a water pipe, a float arranged in said vessel and adapted to project slightly above the water level and to prevent spraying of water into the air space therein, said float having a substantially vertically cylindrical and hollow body adapted to be almost entirely submerged in the water, said float having on its exterior a plurality of circumferential ribs adapted to constitute baffles.

2. In a pump having a compressed air vessel in free communication with a water pipe, a float including a substantially vertically cylindrical hollow body arranged in said vessel and adapted to project slightly above the water level and to prevent spraying of water into the air space therein, the upper extremity of said float having an annular flange fitting in said vessel with only sufficient clearance from the inner surface of said vessel to permit movement of said float in said vessel, and the exterior of the body of said float being provided with a series of circumferential baffles progressively increasing in size towards said flange.

3. In a pump having a compressed air vessel in free communication with a water pipe, a substantially cylindrical hollow float arranged in said air vessel and adapted to project slightly above the water level, the upper extremity of said float having an annular flange fitting in said vessel with sufficient clearance from the inner surface of said vessel to permit free movement of said float in said vessel, said float having on its exterior a plurality of circumferential baffles progressively increasing in size towards said flange, said float being also provided with radial guide ribs parallel with the outer surface of the float body and parallel with the inner surface of the air vessel.

HANS PETERS.